United States Patent [19]
Cheng et al.

[11] Patent Number: 5,734,717
[45] Date of Patent: Mar. 31, 1998

[54] REINFORCED PAY PHONE CASING STRUCTURE

[75] Inventors: Li-Te Cheng; Sung-Min Lin, both of Taipei, Taiwan

[73] Assignee: Karlin Telecomm Corporation, Taipei, Taiwan

[21] Appl. No.: 754,979

[22] Filed: Nov. 22, 1996

[51] Int. Cl.[6] ................................................. H04M 1/00
[52] U.S. Cl. .......................... 379/453; 379/451; 379/437; 379/368
[58] Field of Search ................................ 379/453, 451, 379/437, 428, 447, 144, 145; 312/223.4; 52/27.5

[56] References Cited

U.S. PATENT DOCUMENTS 5,590,191  12/1996  Guevara ..................... 379/451

*Primary Examiner*—Jack Chiang
*Attorney, Agent, or Firm*—Christensen, O'Connor, Johnson & Kindness PLLC

[57] ABSTRACT

A reinforced pay phone casing structure includes an outer casing member having a plurality of openings formed thereon for movably receiving therein dial buttons and an inner reinforcement plate fixed to an inside surface of the casing member by means of welding. The inner reinforcement plate has an opening corresponding to and covering the plurality of dial button openings of the outer casing member. A circuit board shielding plate is fixed to the inner reinforcement plate and the outer casing member by means of bolts. A dial button bezel defining therethrough a plurality of passages for movably receiving therein the dial buttons is arranged between the inner reinforcement plate and the circuit board shielding plate with the bezel received within the opening of the inner reinforcement plate to have the dial button partially extending out of the outer casing member. The circuit board shielding plate has a plurality of pin holes corresponding to and having a cross-sectional dimension smaller than the dial button openings of the outer casing member to movably receive therein pins, the pins having a front end in engagement with the dial buttons and a rear end in engagement with buttons provided on the circuit board so that pushing the dial buttons at the outer casing member drives the corresponding pins to trigger the buttons of the circuit board.

3 Claims, 2 Drawing Sheets

REINFORCED PAY PHONE CASING STRUCTURE

FIELD OF THE INVENTION

The present invention relates to a pay phone casing and in particular to a pay phone casing having reinforcement for protecting the pay phone from being damaged.

BACKGROUND OF THE INVENTION

Pay phones are widely and readily available in cities. The pay phones usually comprise a casing inside which a circuit board is disposed to cooperate with dial buttons that are arranged on a front panel of the casing to provide and perform telecommunication services. The circuit board which is basically a micro-processor based electronic device is perhaps the most valuable part of the pay phones. Since the pay phones may be installed at dark corners or at locations where nobody pays attention to in for example the night time, it is often that the pay phones are broken for stealing the circuit board.

Conventionally, besides the casing structure, the pay phones are not provided with any security measure to prevent the phones from being broken. It is thus desirable to provide a security measure to protect the pay phone by reinforcing the pay phone casing and shielding the circuit boards thereof so as to avoid the above problems.

SUMMARY OF THE INVENTION

The principal object of the present invention is to provide a reinforced pay phone casing for protecting the pay phone from being broken.

It is another object of the present invention to provide an inner shielding member for the provision of further protection of the micro-processor based circuit board.

In accordance with the present invention, there is provided a reinforced pay phone casing structure comprising an outer casing member having a plurality of openings formed thereon for movably receiving therein dial buttons and an inner reinforcement plate fixed to an inside surface of the casing member by means of welding. The inner reinforcement plate has an opening corresponding to and covering the plurality of dial button openings of the outer casing member. A circuit board shielding plate is fixed to the inner reinforcement plate and the outer casing member by means of bolts. A dial button bezel defining therethrough a plurality of passages for movably receiving therein the dial buttons is arranged between the inner reinforcement plate and the circuit board shielding plate with the bezel received within the opening of the inner reinforcement plate to have the dial button partially extending out of the outer casing member. The circuit board shielding plate has a plurality of pin holes corresponding to and having a cross-sectional dimension smaller than the dial button openings of the outer casing member to movably receive therein pins, the pins having a front end in engagement with the dial buttons and a rear end in engagement with buttons provided on the circuit board so that pushing the dial buttons at the outer casing member drives the corresponding pins to actuate the buttons of the circuit board.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

Figure 1:
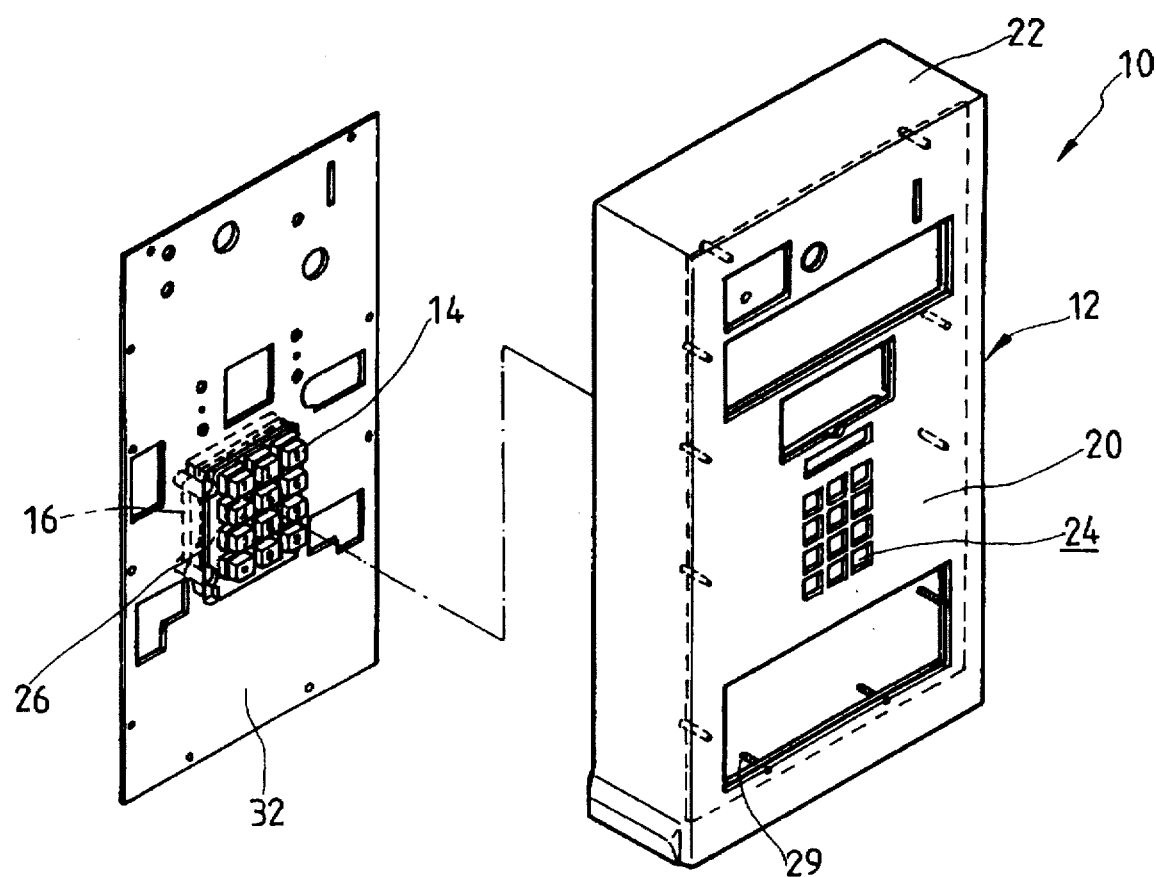
FIG. 1 is a perspective view showing a reinforced pay phone casing structure, together with a circuit board shielding member, in accordance with the present invention.
Figure 2:
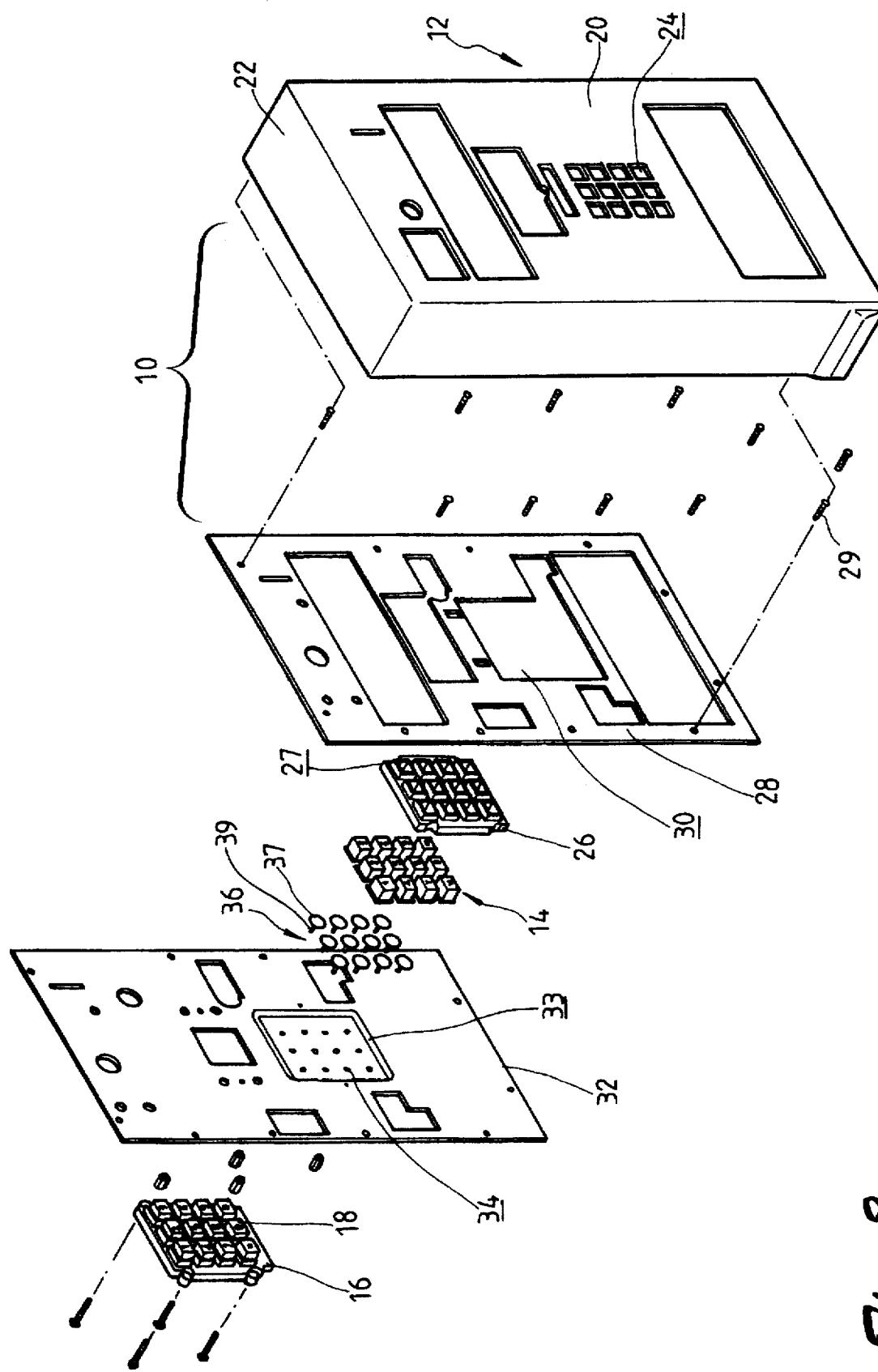
FIG. 2 is an exploded perspective view showing the reinforced pay phone structure and the circuit board shielding member in accordance with the present invention.

With reference to the drawings, wherein FIG. 1 shows a perspective view of a reinforced pay phone casing constructed in accordance with the present invention, generally designated with reference numeral 10, an exploded perspective view of the casing 10 being illustrated in FIG. 2, the reinforced pay phone casing 10 comprises an outer casing member 12 which is in the regular form of pay phone, defining therein an interior space for receiving and holding therein mechanical and electrical elements, including a plurality dial buttons 14 movable to push and actuate a circuit board 16 via on-board buttons 18 provided on the circuit board 16. Other mechanical and electrical elements that are needed for the operation of the pay phone are not illustrated, but are known to those skilled in the art.

The outer casing member 12 comprises a front panel 20 having four edges with four side panels 22 extending therefrom in a substantially normal manner to define the interior space. The front panel 20 comprises a plurality of slots or openings formed thereon, including openings 24 for receiving and holding therein a dial button bezel 26 which defines a plurality of passages 27 for movably receiving therein the dial buttons 14. Since the dial buttons 14 are arranged in a very compact manner, the openings 24 for the dial buttons 14 are separated by very thin partition strips which are easy to be broken.

The reinforced pay phone casing structure 10 of the present invention comprises an inner reinforcement plate 28 fixed to an inside surface of the front panel 20 of the outer casing member 12 by means of for example welding. Attaching the inner reinforcement plate 28 to the front panel 20 of the casing 10 increases the overall thickness and thus the mechanical property thereof.

The inner reinforcement plate 28 comprises a large opening 30 that covers the dial button openings 24 of the front panel 20 of the outer casing member 12 for receiving the bezel 26 therein so as to have the dial buttons 14 extend through the dial button openings 24 and thus partially project out of the outer casing member 12. This does not provide a further protection to the circuit board 16. Thus, the casing structure 10 is further provided with a second reinforcement plate or circuit board shielding plate 32 to protect the circuit board 16.

The circuit board shielding plate 32 is fixed inside the interior space of the outer casing member 12 and secured to the inner reinforcement plate 28 and the outer casing member 12 by means of for example bolts 29 to define a space between the inner reinforcement plate 28 and the circuit board shielding plate 32. Such a space accommodates the thickness of the bezel 26. In this respect, the circuit board shielding plate 32 may be provided with a recess 33 substantially corresponding to the size of the bezel 26 to partially receive the bezel 26 therein with the bezel 26 held within the opening 30 of the inner reinforcement plate 28.

The circuit board shielding plate 32 comprises a plurality of small pin holes 34 located within the recess 33 to correspond to the dial button openings 24 of the front panel 20 of the outer casing member 12 to each receive therein a pin 36 in a movable manner. The pins 36 have an outer end 37 in contact engagement with the dial buttons 14 so that by pushing the dial buttons 14, the associated pins 36 are driven inward in the respective pin holes 34. The pins 36 also have an inner end 39 in contact engagement with the on-board buttons 18 so as to actuate the on-board buttons 18 to perform dialing and other functions of the pay phone when driven by the dial buttons 14.

Preferably the outer ends of the pins 36 have an expanded portion to be received within rear side recesses (not shown) formed on the dial buttons 14 to provide engagement therebetween. This is known to those having ordinary skills.

Since the circuit board shielding plate 32 has only pin holes 34 of smaller cross-sectional dimension than the dial button openings 24 of the front panel 20 of the outer casing member 12, the partition portions between the adjacent pin holes 34 have a greater width and thus are significantly strengthened. This increases the capability of the circuit board shielding plate 32 against breaking.

Although a preferred embodiment has been described to illustrate the present invention, it is apparent that changes and modifications in the specifically described embodiment can be carried out without departing from the scope of the invention which is intended to be limited only by the appended claims.

What is claimed is:

1. A reinforced pay phone casing structure comprising an outer casing member defining a front panel and an interior space, the front panel having a plurality of button openings formed thereon for movably receiving therein dial buttons, an inner reinforcement plate fixed to an inside surface of the outer casing member and thus located within the interior space of the outer casing member, the inner reinforcement plate having an opening corresponding to and covering the button openings of the outer casing member and a circuit board shielding plate disposed within the interior space with a front surface facing the inner reinforcement plate and a rear surface adapted to have a circuit board attached thereto, the circuit board having on-board buttons corresponding to the dial buttons actuateably attached thereto, the circuit board shielding plate having formed thereon a plurality of pin holes having a cross-sectional dimension smaller than the button openings of the outer casing member to each movably receiving therein a pin, each of the pins having a front end in contact engagement with the respective dial button and a rear end in contact engagement with the respective on-board button of the circuit board so that the movement of the dial buttons within the button openings drives the pins to actuate the on-board buttons of the circuit board.

2. The reinforced pay phone casing structure as claimed in claim 1, wherein the reinforced pay phone casing structure further comprises a dial button bezel defining a plurality of passages for movably receiving the dial buttons therein, the bezel being received through the opening of the inner reinforcement plate to have the dial buttons partially extend out of the outer casing member through the button openings of the outer casing member.

3. The reinforced pay phone casing structure as claimed in claim 2, wherein the circuit board shielding plate has a recess formed on the front surface thereof, having a size substantially corresponding to the bezel for partially receiving the bezel and the dial buttons therein, the pin holes being formed within the recess.

* * * * *